United States Patent [19]

Komata et al.

[11] Patent Number: 4,751,511

[45] Date of Patent: Jun. 14, 1988

[54] METHOD AND APPARATUS FOR ESTIMATING TRAJECTORY

[75] Inventors: Asao Komata, Fuchu; Kiyoshi Miyashin, Yamato; Hiroshi Ueno, Isehara; Tohru Ohnuma, Kawasaki, all of Japan

[73] Assignee: Fujitsu Limited, Kawasaki, Japan

[21] Appl. No.: 736,779

[22] Filed: May 22, 1985

[30] Foreign Application Priority Data

May 24, 1984 [JP] Japan .................. 59-103656

[51] Int. Cl.$^4$ .......................................... G01S 13/58
[52] U.S. Cl. ......................................... 342/59; 342/424
[58] Field of Search ............ 343/9 R, 10, 11 R, 16 M, 343/424, 463–465, 776; 342/59, 80, 104, 105, 106, 107, 109, 117

[56] References Cited

U.S. PATENT DOCUMENTS

| | | | |
|---|---|---|---|
| 3,295,128 | 12/1966 | Canaday et al. | 343/11 R X |
| 3,982,713 | 9/1976 | Martin | 343/9 X |
| 4,546,355 | 10/1985 | Boles | 343/17 |
| 4,549,184 | 10/1985 | Boles et al. | 343/11 R |
| 4,563,686 | 1/1986 | Boles | 343/17 |

FOREIGN PATENT DOCUMENTS

| | | | |
|---|---|---|---|
| 1605303 | 8/1974 | France . | |
| 0817168 | 7/1959 | United Kingdom . | |
| 2033691 | 5/1980 | United Kingdom | 342/119 |
| 2041688 | 9/1980 | United Kingdom . | |

OTHER PUBLICATIONS

M. Skolnik, *Intro. to Radar Systems*, pp. 165–167; (McGraw-Hill, 1980).
European Search Report EP 85 10 5275, Jan. 23, 1987.

*Primary Examiner*—Theodore M. Blum
*Assistant Examiner*—Bernarr E. Gregory
*Attorney, Agent, or Firm*—Staas & Halsey

[57] ABSTRACT

A method and apparatus for estimating the trajectory of a projectile using two interferometric radar antennas each producing a group of interferometric antenna lobes forming intersecting solid angles, and being directed at an elevation angle so that the projectile passes through each interferometric antenna lobe. Each radar antenna transmits a different frequency of pulsed RF power and receives pulsed RF signals reflected from the projectile whenever the projectile passes through the antenna lobes of the radar antennas. Based on the received signals of respective radar antennas, the range and time information for the projectile passing through the antenna lobes of the respective radar antennas can be obtained. From this range and time information, the three-dimensional coordinates, speed and acceleration at the points in the antenna lobes through which the projectile passes can be obtained. From the 3-dimensional coordinates and the speed and acceleration of the projectile, the trajectory of the projectile can be estimated.

6 Claims, 5 Drawing Sheets

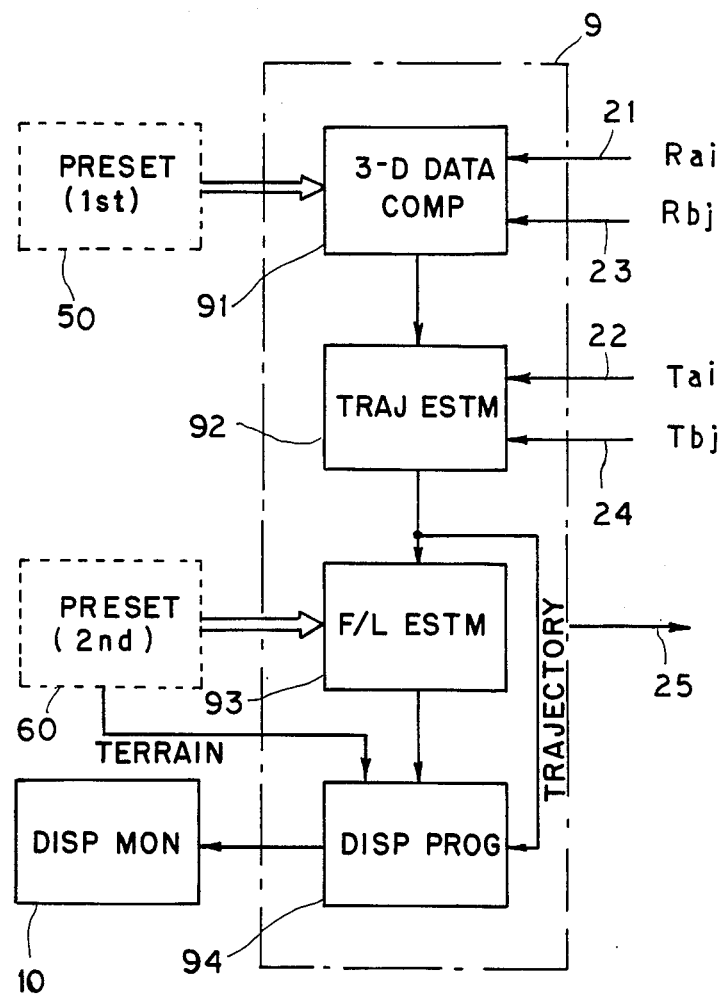

METHOD AND APPARATUS FOR ESTIMATING TRAJECTORY

BACKGROUND OF THE INVENTION

The present invention relates to a method and apparatus for estimating, via radar, the trajectory of a projectile such as a rocket shell or a mortar shell. More particularly, the present invention relates to a radar system from which 3-dimensional coordinate information for the trajectory of an object is obtained by using two intersecting signal groups, each generated by a plurality of fan-shaped antenna lobes; and by applying an interferometric method to the signals.

It is well known that the location, as well as an estimate of origin, and an estimate of destination of an airframe like an aircraft can be detected using a conventional radar system. Similar information for a projectile such as a mortar shell can be obtained, using radar called mortar locating radar. With mortar locating radar, the firing point of the mortar shell can be estimated, even though the firing point is hidden behind the lay of the land, such as a hill or a mountain. The estimation can be made by: (1) covering two or three separate sectors with radar fan beams, each sector formed by successively scanning a pencil beam; (2) detecting the mortar shell as it successively passes through the sectors, by receiving reflected waves from the shell; (3) obtaining 3-dimensional coordinates of the shell, using the time information from the pencil beam scanning and the received reflected waves; (4) estimating the trajectory of the shell from the 3-dimensional coordinate information; and (5) estimating the firing point of the shell.

However, in conventional mortar locating radar, the pencil beam is used to cover the sectors of radar fan beams, so the number of the fan beams is limited to two or three. Consequently, if more fan beams are required, the radar system becomes very complicated. This is because a plurality of radar beams would have to be used, each having a different radio frequency (RF). Therefore, it is difficult to achieve high accuracy when estimating the trajectory and the firing position of a mortar shell using conventional motar locating radar.

SUMMARY OF THE INVENTION

An object of the present invention is to increase the accuracy of estimating a firing point of a projectile using simple radar equipment.

Another object of the present invention is to obtain a great deal of 3-dimensional coordinate information for the projectile using a simple radar apparatus.

Still another object of the present invention is to simultaneously obtain trajectory information for the projectile using a simple radar apparatus.

A further object of the present invention is to realize the above objects with high reliability.

Still a further object of the present invention is to realize the above objects at a low cost.

The above and other objects of the present invention are achieved by applying an interferometric antenna method to a radar apparatus. Applying this method to a radar apparatus, a plurality of (a group of) fan-shaped antenna lobes can be provided by using at least two antenna elements such as horn antennas. By providing two groups of interferometric antenna lobes and intersecting the two groups with each other with a proper angle, the 3-dimensional trajectory of the projectile can be obtained by receiving signals reflected from the projectile which successively penetrates the interferometric antenna lobes of the two groups. So the firing or launching position of the projectile can be estimated from the obtained 3-dimensional trajectory.

Thus, by using the interferometric antenna method with a radar apparatus, many interferometric antenna lobes can be provided without using any pencil beam. Resultingly, a great deal of the trajectory information can be obtained simultaneously. In accordance with the present invention the accuracy of projectile trajectory estimation is increased by using a simple, high reliability radar apparatus.

BRIEF DESCRIPTION OF THE DRAWINGS

FIG. 7 is a block diagram of a trajectory estimator embodying the radar apparatus of the present invention.

DETAILED DESCRIPTION OF THE PREFERRED EMBODIMENT

Figure 1:
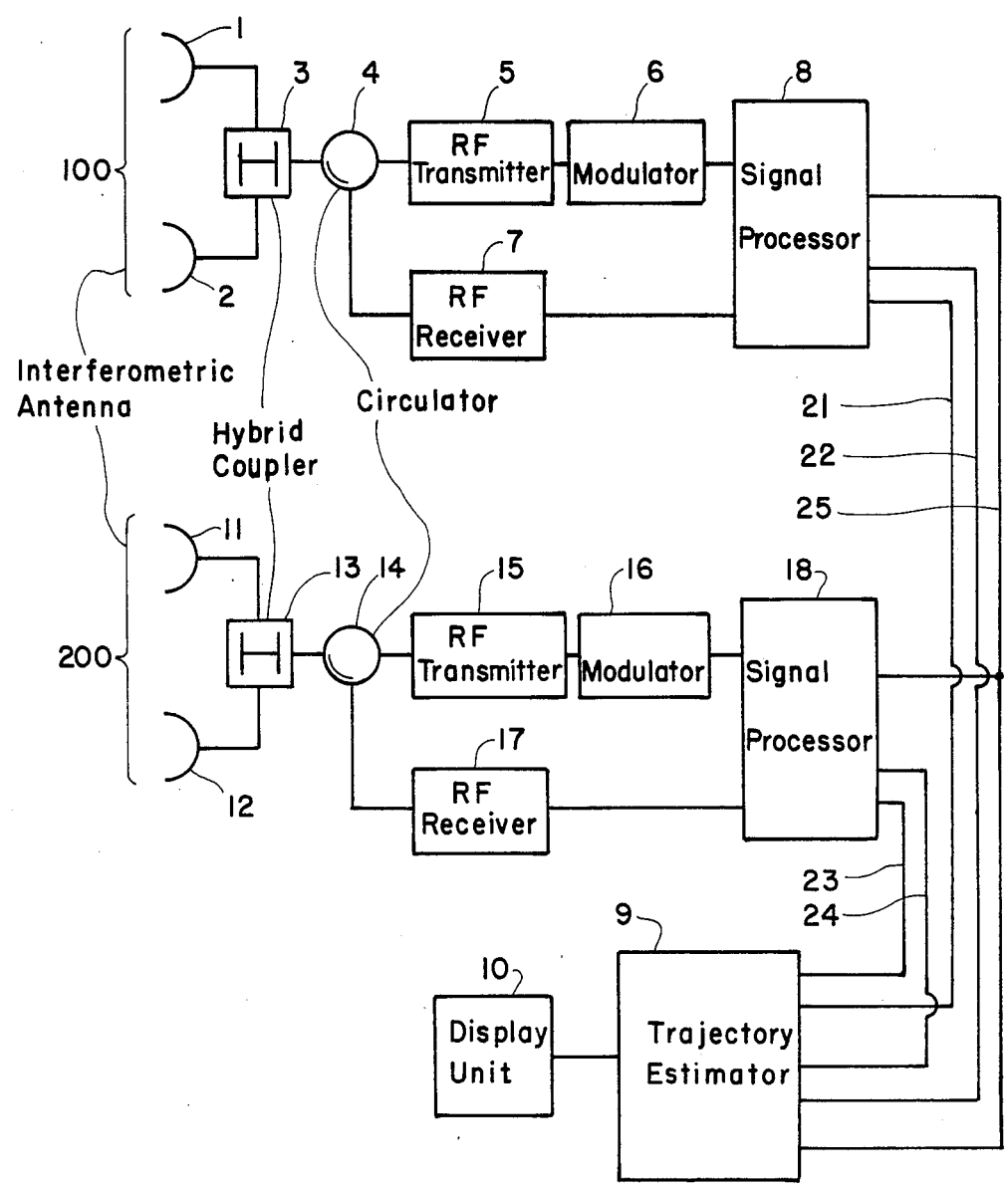
FIG. 1 is a block diagram of a radar apparatus embodying the present invention.

FIG. 1 is a block diagram of a radar apparatus embodying the present invention. This apparatus has two interferometric antennas 100 and 200, each comprisinq a couple of horn antennas 1 and 2, and 11 and 12, respectively. The interferometric antenna produces a plurality (group) of interferometric antenna lobes. The radar equipment comprises paired similar units corresponding to reference numerals 1 thru 8 and 11 thru 18 in FIG. 1. In FIG. 1, reference numeral 8 (18) represents a signal processor from which a trigger signal having a designated pulse repetition frequency (PRF) is provided. The PRF is selected in accordance with a serviceable range to a target (projectile); and the PRFs for the signal processors 8 and 18 are almost, but not necessarily equal and synchronized.

The trigger signal from the signal processor 8 (18) is applied to a modulator 6 (16) in which a pulse-signal is produced for application to a transmitter 5 (15). The transmitter 5 (15) generates a pulsed microwave or millimeter wave RF signal. The signals from the transmitters 5 and 15 are slightly different from each other so that, for example, the RF signal transmitted from one interferometric antenna (e.g., 100) cannot be detected by receiver 17. The generated pulsed RF signal is applied to a hybrid coupler 3 (13) through a circulator 4 (14). The circulator 4 (14) automatically switches the RF signal to the antenna 100 (200) from the transmitter 5 (15) when the radar apparatus transmits the RF signal, and automatically switches the RF signal received at the antenna 100 (200) to a receiver 7 (17) when the radar equipment receives the RF signal. When transmitting a RF signal, the hybrid coupler 3 (13) separates the RF signal from the circulator 4 (14) so that respective halves are fed to the horn antennas 1 (11) and 2 (12), respectively. When the antenna 100 (200) is receiving a RF signal, the coupler 3 (13) combines the RF signals received at the horn antennas 1 (11) and 2 (12) and feeds the combined signal to the receiver 7 (17).

Figure 2:
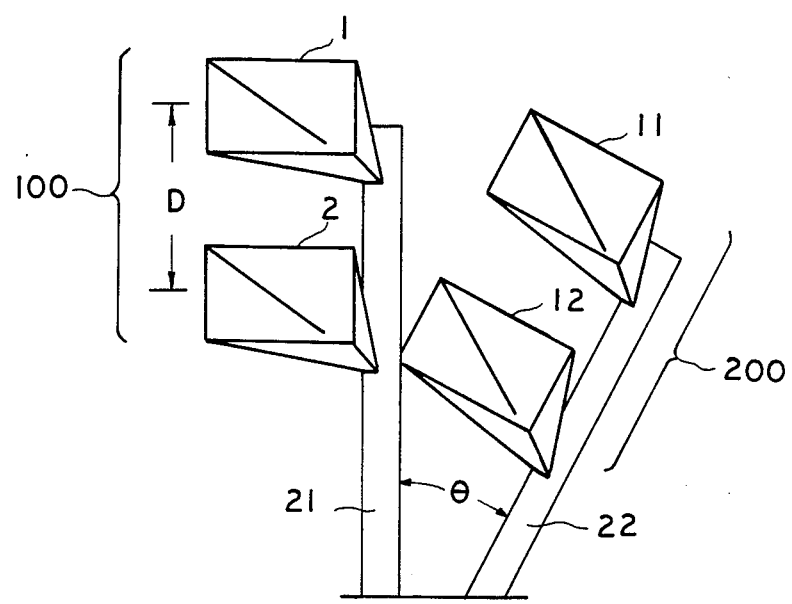
FIG. 2 illustrates a configuration of interferometric antennas in the radar apparatus embodying the present invention.

FIG. 2 illustrates an arrangement of antennas 100 and 200. In FIG. 2, antennas 100 and 200 are arranged on respective struts 21 and 22 so that center lines of the serviceable solid angles (each comprising respective groups of the antenna lobes for antennas 100 and 200) intersect at an angle $\theta$.

The characteristics of each antenna lobe, such as the serviceable solid angle (solid angle) and the angle between the adjacent antenna lobes, depend on, for example, the directional characteristics of the respective antenna elements (e.g., the horn antenna in FIG. 2); the number of antenna elements; the distance between neighboring antenna elements; and the wavelength of the transmitted RF signal. Especially, there is a relation among the angle $\gamma$(radians (rad)) between adjacent antenna lobes, the distance D (millimeters (mm)) between the neighboring antenna elements, and the wavelength $\lambda$(mm) as follows:

$$\gamma = \lambda/D \text{ (rad)} \quad (1)$$

For example, in FIG. 2, if the horn antennas 1 and 2 are equal with respect to a shape and size having the same antenna pattern of 60° and 25° in azimuth and elevation angles respectively, each of the solid angles of the antenna 100 and 200 is almost equal to the antenna pattern of each horn antenna with respect to the azimuth and elevation angles; and if the distance D is 460 (mm) and the wavelength $\lambda$ is 10 (mm), the angle $\lambda$ is 10/460 (rad) per equation (1). The angle 10/460 (rad) corresponds to approximately 1.25 degrees, so the interferometric antenna 100 has twenty antenna lobes from the calculation of 25°/1.25° = 20 (lobes).

Figure 3:
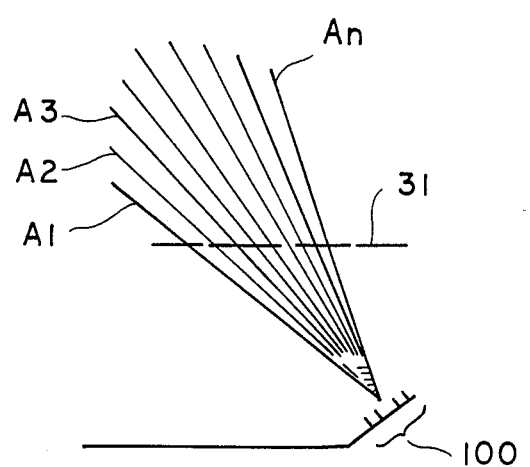
FIG. 3 schematically illustrates a group of interferometric antenna lobes through which a projectile is flying.
Figure 4:
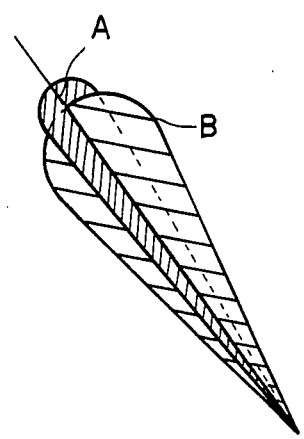
FIG. 4 illustrates two intersecting interferometric antenna lobes of respective groups of the interferometric antenna lobes.

FIG. 3 schematically illustrates a sectional side elevation of one group of antenna lobes. In FIG. 3, A1, A2, —, and An (n is 20 in the above example) represent the solid angles for the antenna lobes. Antenna 200 also provides a plurality of the antenna lobes forming solid angles. The solid angles of the antennas 100 and 200 are elevated respectively from the horizon and intersect each other at an angle $\theta$. FIG. 4 illustrates the intersection of the antenna lobes for antennas 100 and 200.

In the above explanation, the number of the antenna lobes "twenty" was derived from equation (1) using the directional characteristics of the interferometric antenna and the distance D. However, the distance D is usually derived from the directional characteristics of the interferometric antenna, the number of the antenna lobes, and the wavelength $\lambda$.

When the directional characteristics are 60° and 25° in azimuth and elevation angles respectively; the number of the antenna lobes is twenty; the horn antennas have the same shape and size; the number of the horn antennas is two; and the wavelength $\lambda$ is 10 mm, then both the structure of the horn antenna and the distance D can be obtained by one skilled in the art of antenna design. Accordingly, the depth of the horn antenna along its axis is 200 mm, the vertical length of a horn antenna aperture is also 200 mm and the distance D can be obtained from equation (1) as follows:

$$25°/20° = 360°/2\pi \times 10/D,$$

therefore, D=460 (mm). Such conventional calculations are illustrated in, for example, H. Jasik, *Antenna Engineering Handbook*, McGraw-Hill, 1961; and S. Silver, *Microwave Antenna Theory and Design*, MIT Radiation Lab. Series Vol. 12, McGraw-Hill 1949.

In the above, 25°/20° is the angle $\gamma$ in degrees, the numeral 10 is the wavelength $\lambda$, and the term 360°/2$\pi$ is a factor for converting degrees to radians. Since the distance D between the horn antennas is obtained as 460 mm and the vertical length of each horn antenna is 200 mm, there is enough space between the horn antennas so that they can be installed on a strut such as shown in FIG. 2.

The antennas 100 and 200 receive radio waves reflected from the projectile as it flies through the respective antenna lobes. The RF signals received by antenna 100 are applied to the receiver 17 through the hybrid coupler 3 and the circulator 4, and then amplified and applied to the signal processor 8 as shown in FIG. 1. Similarly, signals received by antenna 200 are applied to the receiver 17 through the hybrid coupler 13 and the circulator 14, and then amplifed and applied to the signal processor 18.

Figure 5:
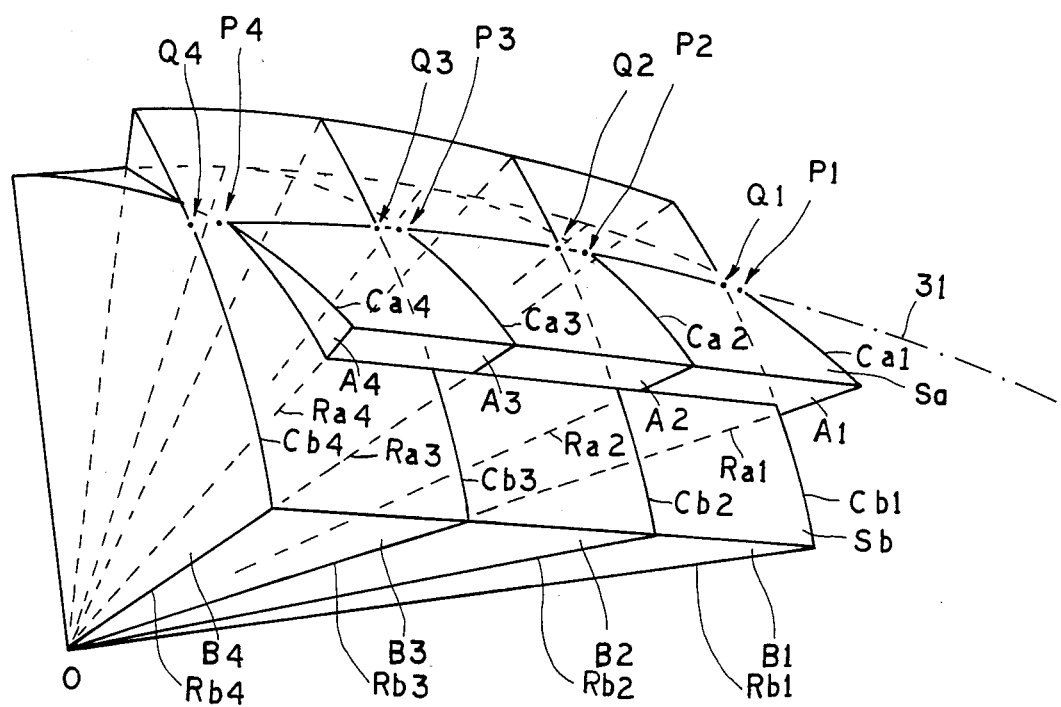
FIG. 5 schematically illustrates a projectile penetrating the two intersecting groups of the interferometric antenna lobes.

FIG. 5 schematically illustrates a projectile penetrating antenna lobes Ai and Bj (i=j=1, 2, —, n) of the respective antennas 100 and 200. In FIG. 5, reference symbol O indicates the position of the radar apparatus. The antenna lobes A1, A2, and A3 are shown as part of the antenna lobes Ai; similarly, the antenna lobes B1, B2, and B3 are shown as a part of the antenna lobes Bj. The respective antenna lobes Ai and Bj from the solid angles, which are elevated and intersect at an angle $\theta$ as mentioned before. In FIG. 5, the trajectory of the projectile is shown by a chained line 31.

When the projectile penetrates the lobe A1, antenna 100 receives the echo of the projectile and the radar apparatus measures a range $R_{a1}$; similarly when the projectile penetrates lobe B1, the antenna 200 receives an echo and the radar apparatus measures a range $R_{b1}$. The range $R_{a1}$ defines a circle having a radius of $R_{a1}$ in the antenna lobe A1; and reference numeral $C_{a1}$ represents a part of this circle within the 60° azimuth characteristic of the antenna lobe A1. Similarly, the range $R_{b1}$ defines a part $C_{b1}$, of the circle having a radius $R_{b1}$ for the antenna lobe B1. So, two curved surfaces $S_a$ and $S_b$ can be obtained, the surface $S_a$ includes the circle parts $C_{ai}$ (i=1, 2, —, 20) and the other surface $S_b$, includes the circle parts $C_{bj}$ (j=1, 2, —, 20). This means that the trajectory of the projectile must be on a curve defined by the intersection of curved surfaces $S_a$ and $S_b$; that is, the trajectory including the points P1, Q1, P2, Q2, —can be obtained as the solution of the simultaneous equations for the curves of surfaces $S_a$ and $S_b$.

Figure 6:
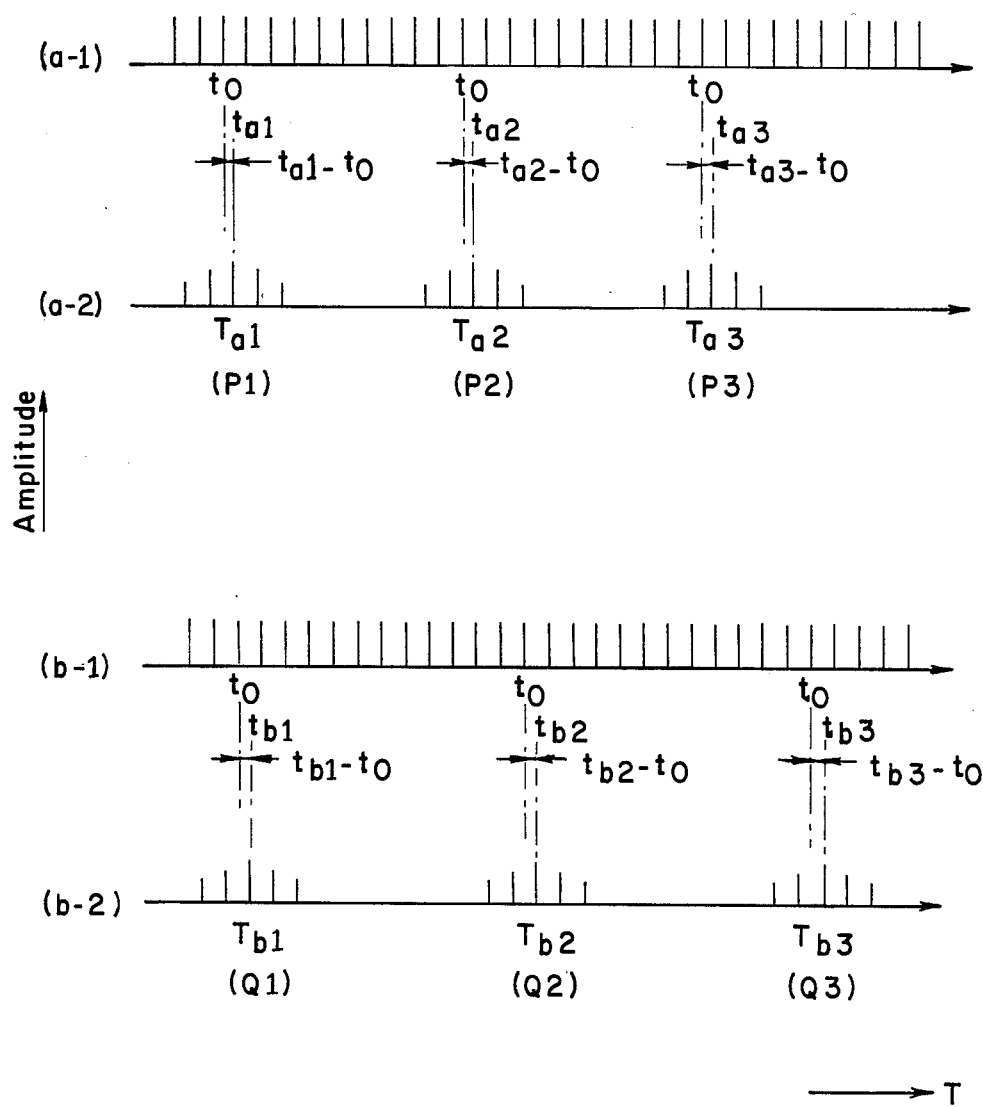
FIG. 6 is a timing diagram for a first group of interferometric antenna lobe pulse-signals reflected from a projectile and a second group of interferometric antenna lobe pulse-signals reflected from the projectile.

FIG. 6 is a timing diagram for the signals received by the antennas 100 and 200. In FIG. 6, the ordinate represents the amplitude of the transmitted and received pulse-signals, and the abscissa represents time T. FIGS. 6 (a-1) and 6 (b-1) show pulse-signals transmitted from the antennas 100 and 200 respectively and indicate that the PRFs and the timing of the pulses transmitted from the antennas 100 and 200 are not necessary exactly equal to each other. FIGS. 6 (a-2) and 6 (b-2) show respective series of signals received by the antennas 100 and 200.

The individual antenna lobes of the antenna 100 and 200 are actually fan-shaped lobes so that the projectile reflects several pulse-signals as it passes through each antenna lobe. Therefore, antennas 100 and 200 respectively receive a plurality of pulse-signals as the projectile passes through respective antenna lobes.

FIGS. 6 (a-2) and 6 (b-2) each show three groups of received pulse-signals. These groups represent the signals reflected by the projectile while in respective antenna lobes A1, A2, A3 and B1, B2, B3. The pulse-signal having the maximum amplitude in each group represents the signal reflected by the projectile as it passes through the middle point of a respective antenna lobe; the points P1, P2, P3, Q1, Q2 and Q3 designate the middle point signals. Reference symbols $T_{a1}$, $T_{a2}$ and $T_{a3}$ indicate the time when the projectile passes through the points P1, P2, and P3 respectively. Similarly, $T_{b1}$, $T_{b2}$, and $T_{a3}$ indicate the time when the projectile passes through the points Q1, Q2, and Q3 respectively. Reference symbols $t_{a1}$, $t_{a2}$ and $t_{a3}$ are times measured from time $t_0$. The time $t_0$ represents the time when the received pulse-signal was transmitted from the antenna 100.

From the respective time differences $t_{a1}-t_0$, $t_{a2}-t_0$ and $t_{23}-t_0$, the ranges $R_{a1}$, $R_{a2}$ and $R_{a3}$ can be obtained in accordance with conventional radar ranging theory. Similarly, from the time differences $t_{b1}-t_0$, $t_{b2}-t_0$ and $t_{b3}-t_0$, the ranges $R_{b1}$, $R_{b2}$ and $R_{b3}$ can be obtained. Thus, the ranges $R_{ai}$ and $R_{bj}$ (i=j=1, 2, —, n) can be obtained.

When the radar echo signals for the antenna lobes Ai (Bj) are applied to the signal processor 8 (18), the signal processor 8 (18) performs the following: (1) discriminates the radar echo signals for each antenna lobe; (2) selects a signal corresponding to the middle point of each antenna lobes Ai (Bj); obtains the ranges $R_{ai}$ ($R_{bj}$); and (3) produces the time information $T_{ai}$ ($T_{bj}$) (i=j=1, 2, —, n) corresponding to the projectile passing through the middle points Pi (Qj) (i=j=1, 2, —, n). In the above description, the discrimination can be effected because the antenna lobes of the antenna 100 and 200 are fixed against the ground having a known elevation angle and a known intersection angle $\theta$, so that the signal first received by the antenna 100 (200) can be designated as the signal of the antenna lobe A1 (B1) and the second received signal designated as the signal of the antenna lobe A2 (B2) and so on; the selection can be effected by detecting the signal having the maximum amplitude from each group of the received signals; and the time information can be determined by using time reference signals provided by a trajectory estimator 9 (FIG. 7) through a connection line 25. In other words, the signal processors 8 and 18 produce the ranges $R_{ai}$ and $R_{bj}$ and the time information $T_{ai}$ and $T_{bj}$ for the projectile which passes through respective antenna lobes, and then send this information to the trajectory estimator 9 through the connection lines 21 and 22 (23 and 24), respectively.

FIG. 7 is a block diagram of the trajectory estimator 9 connected to a display unit 10. The trajectory estimator 9 is a conventional computing system, and the display unit 10 is a conventional display unit.

The signals $R_{ai}$ and $R_{bj}$ from the signal processors 8 and 18 are applied to a 3-dimension data computing unit (3-D DATA COMP) 91, together with preset information such as the directions of the antenna lobes of the respective interferometric antenna. These preset conditions are provided by PRESET (1st) 50 in FIG. 7. The 3-D DATA COMP 91 computes the 3-dimensional coordinates of the points Pi and Qj through which the projectile has passed, as are such points in the conventional motor locating radar, although with many more data points.

The 3-dimensional coordinates of the points Pi and Qj and the time information $T_{ai}$ and $T_{bj}$ from the signal processors 8 and 18 are applied to a trajectory estimating unit (TRAJ ESTM) 92 which computes the speed and acceleration of the projectile at the points Pi and Qj and the trajectory such as the curved line defined by the intersection of the curved surfaces $S_a$ and $S_b$ in FIG. 5. The trajectory estimation can be made by applying conventional Kalman filtering, which is a conventional algorithm for tracking an artificial satellite orbit, and is explained, for example, in: "A New Approach to Linear Filtering and Prediction Problems" by R. E. Kalman, published by Trans. ASME, J. Basic Eng., vol 82d, No. 1 (1960), 35–45; "New Results in Linear Filtering and Prediction Theory" by R. E. Kalman and R. S. Bucy, published by Trans. ASME, J. Basic Engl., vol 83D, No. 1 (1961), 95–108; and "Kalman Filter" by Taku Arimoto, published by Sangyo Tosho (1977). Highly accurate estimation can be performed with the present invention because the present invention provides many data points from the antenna, for example, as many as forty or fifty (twice the number of lobes of each interferometric antenna).

The firing point of the projectile can be computed by the firing or launching point estimating unit (F/L ESTM) 93, using the estimated trajectory from the TRAJ ESTM 92, and wind and terrain information provided by PRESET (2nd) 60 in FIG. 7, as is such a point in the conventional motor locating radar, although with many more data points.

The computed trajectory and the firing point of the projectile are displayed on a display unit 10. The display can include a terrain map on a cathode-ray tube, for example, so as to make the decision to fire at the firing point easy. The terrain is displayed via a display programming unit (DISP PROG) 94.

All of the above processes and computations can be performed by a central processing unit, which also generates the reference time signals 25. Reference numerals 21, 22, —, and 25 in FIG. 7 are the connecting lines corresponding to those in FIG. 1.

In the above description, the interferometric antennas are arranged as shown by the interferometric antennas 100 and 200 in FIG. 1; however, it is not necessary to combine them at one place. They can be separately placed, it is, however, important to make the interferometric antenna lobes of the respective interferometric antennas intersect each other.

Thus, if there is only one interferometric antenna, the 3-dimensional coordinates of the projectile cannot be obtained. However, the interferometric antenna lobes of one interferometric antenna can be used for detecting and ranging the projectile. In FIG. 5, if there is only one group of antenna lobes Ai, the projectile can be detected and the range to the projectile from the point O can be obtained when the projectile passes through at least one of the antenna lobes Ai. This is another usage of the interferometric radar antenna lobes.

What is claimed is:

1. A method for detecting a projectile using a radar system, said method comprising the steps of:
   (a) generating a first group of fan-shaped interferometric antenna lobes such that said first group of lobes defines a first continuous surface including solid angles of each of said first group of lobes;

(b) generating a second group of fan-shaped interferometric antenna lobes such that said second group of lobes defines a second continuous surface including solid angles of each of said second group of lobes and so that said solid angles of said first group of lobes intersect said solid angles of said second grup of lobes;

(c) elevating said solid angles at an angle from the ground at a point where the radar system is located;

(d) detecting the projectile as it penetrates at least one of said antenna lobes by receiving at least one radar echo signal reflected from the projectile;

(e) measuring the distances between the radar system and two points in respective antenna lobes through which the projectile passes;

(f) obtaining the times at which the projectile passes through said two points; and (g) obtaining the speed and acceleration of the projectile as it passes through said two points.

2. A method for estimating the trajectory of a projectile using a radar system, said method comprising the steps of:

(a) generating a first group of fan-shaped interferometric antenna lobes using a first interferometric antenna and a first RF signal, such that said first group of lobes defines a first continuous surface including solid angles of each of said first group of lobes;

(b) generating a second group of interferometric antenna lobes using a second interferometric antenna and and second RF signal different than said first RF signal, such that said second group of lobes defines a second continuous surface including solid angles of each of said second group of lobes, and so that said solid angles of said first group of lobes respectively intersect solid angles of said second group of lobes;

(c) elevating said solid angles at an angle from the ground at a point where the radar system is located;

(d) receiving RF signals reflected from the projectile as the projectile penetrates said first group of lobes and said second group of lobes;

(e) measuring distances between said first and said second interferometric antennas and points in said first and said second groups of antenna lobes through which the projectile passes;

(f) obtaining time information for the projectile as it passes through each of said points;

(g) obtaining the speed and acceleration of the projectile as it passes through each of said points; and (h) estimating the three-dimensional trajectory of the projectile using said distances, said speed and acceleration, said elevation angle and said intersection angle of said solid angles of the respective antenna lobes for each of said first and second groups of antenna lobes.

3. An apparatus in a radar system for estimating the trajectory of a projectile, comprising:

first interferometric antenna means for transmitting and receiving a RF signal, and for providing a first group of interferometric antenna lobes, each including a solid angle;

second interferometric antenna means for transmitting and receiving a RF signal, and for providing a second group of interferometric antenna lobes, each including a solid angle, each of said first and second interferometric antenna means including two antenna elements arranged so that: (1) the antenna patterns for each element overlap, (2) the distance D (mm) between the antenna elements satisfies $\gamma = \lambda/D$ where $\gamma$ (radian) corresponds to an angle between respective lobes in said first and second groups of interferometric antenna lobes, and $\lambda$(mm) is the wavelength of the respective RF signals transmitted by said first and said second antenna means, and (3) said solid angles of said first and said second groups of interferometric antenna lobes intersect at an intersection angle and said first and said second antenna means being elevated by an elevation angle;

first and second RF transmitter means, respectively connected to said first and said second interferometric antenna means, for transmitting the respective RF signals in accordance with a pulse repetition rate control signal, each RF signal having a different frequency;

first and second RF receiver means, respectively connected to said first and said second interferometric antenna means, for detecting RF signals received by respective ones of said first and said second interferometfic antenna means and for converting said received signals into pulsed video signals, said RF signals received by said first and said second interferometric antenna means corresponding to RF signals reflected from the projectile;

signal processor means for providing the pulse repetition rate control signal, for calculating range signals corresponding to the distance between said antenna elements and points in said first and second groups of interferometric antenna lobes through which the projectile passes, and for providing time information associated with the projectile passing through each of the points in said first and said second groups of interferometric antenna lobes;

three-dimensional data computing means for computing three-dimensional coordinates for each of said points using the range signals, said elevation angle and said intersection angle; and trajectory estimating means for computing a continuous three-dimensional trajectory extending through each of said points, using the computed three-dimensional coordinates of each of said points and said time information.

4. The apparatus according to claim 3 further comprising:

first hybrid coupler means, operatively connected between said first interferometric antenna means, and said first RF transmitter means and said first RF receiver means, for dividing the RF signal into half and applying each half to respective ones of said antenna elements of said first antenna means, and for combining the RF signals received by each of said two antenna elements of said first antenna means;

first circulator means, operatively connected between said first hybrid coupler, and said first transmitter means and said first receiver means, for channeling said RF signal from said RF transmitter to said first interferometric antenna means, and for automatically channeling said RF signal from said first hybrid coupler to said first RF receiver means;

second hybrid coupler means, operatively connected between said second interferometric antenna means, and said second RF transmitter means and said second RF receiver means, for dividing the RF signal into half and applying each half to respective ones of said antenna elements of said second antenna means, and for combining the RF signals received by each of said two antenna elements of said second antenna means; and second circulator means, operatively connected between said second hybrid coupler, and said second transmitter means and said second receiver means, for channeling said RF signal from said RF transmitter to said second interferometric antenna means, and for automatically channeling said RF signal from said second hybrid coupler to said second RF receiver means.

5. The apparatus according to claim 4, wherein each of said antenna elements comprises a horn antenna element.

6. The apparatus according to claim 3, wherein each of said antenna elements comprises a horn antenna element.

* * * * *

UNITED STATES PATENT AND TRADEMARK OFFICE
CERTIFICATE OF CORRECTION

PATENT NO. : 4,751,511

DATED : June 14, 1988

INVENTOR(S) : Asao Komata et al.

It is certified that error appears in the above-identified patent and that said Letters Patent is hereby corrected as shown below:

Col. 3, line 39, "$\lambda$" (second occurrence) should be "$\gamma$".

Col. 5, line 18, "$T_{a3}$" should be --$T_{b3}$--.

Col. 7, line 8, "grup" should be --group--.

Col. 8, line 27, "interferometfic" should be --interferometric--;

line 41, "three -dimensional" should be --three-dimensional--;

line 50, after "3" insert --,--.

Signed and Sealed this

Nineteenth Day of December, 1989

Attest:

JEFFREY M. SAMUELS

Attesting Officer     Acting Commissioner of Patents and Trademarks